Patented Nov. 10, 1925.

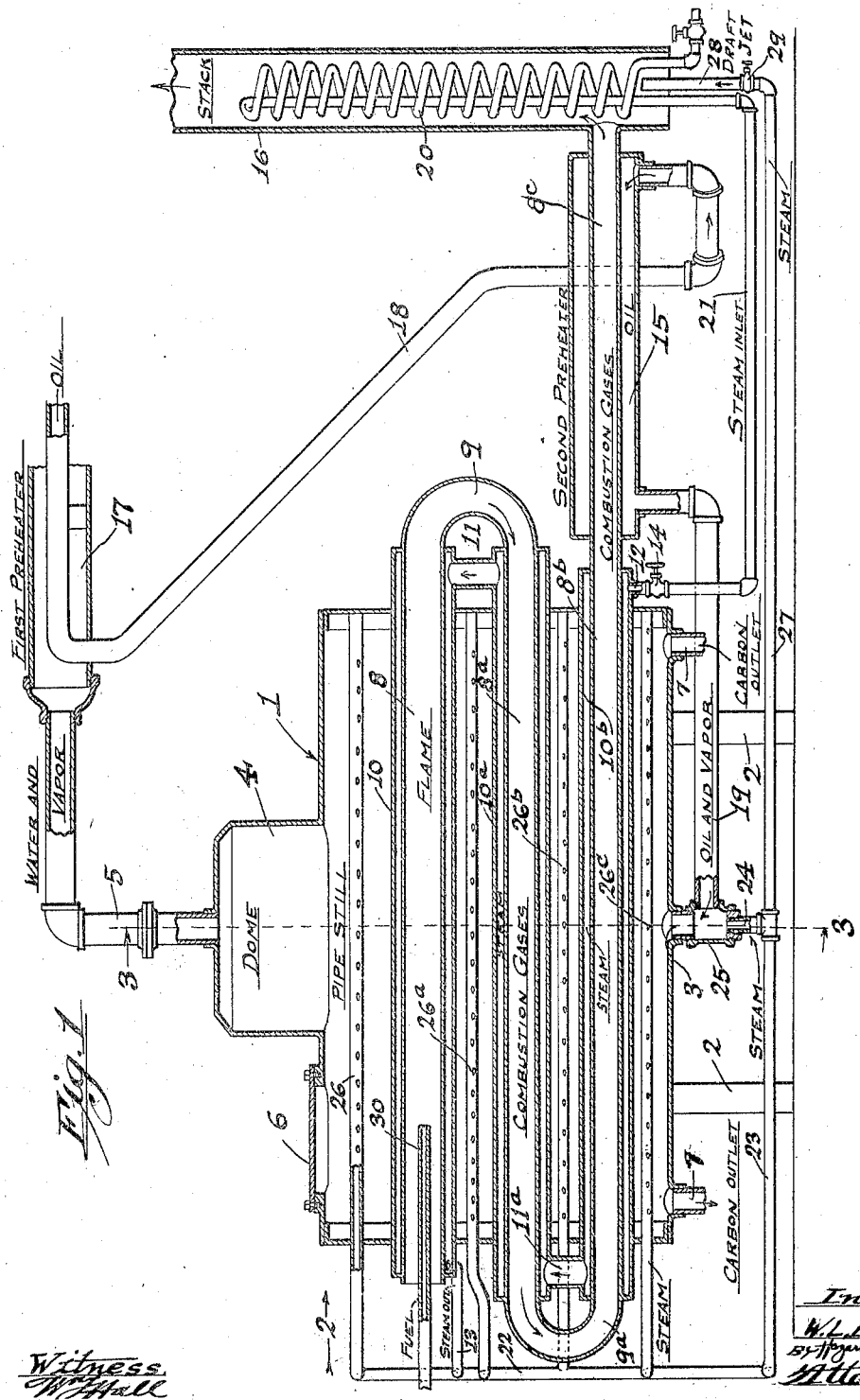

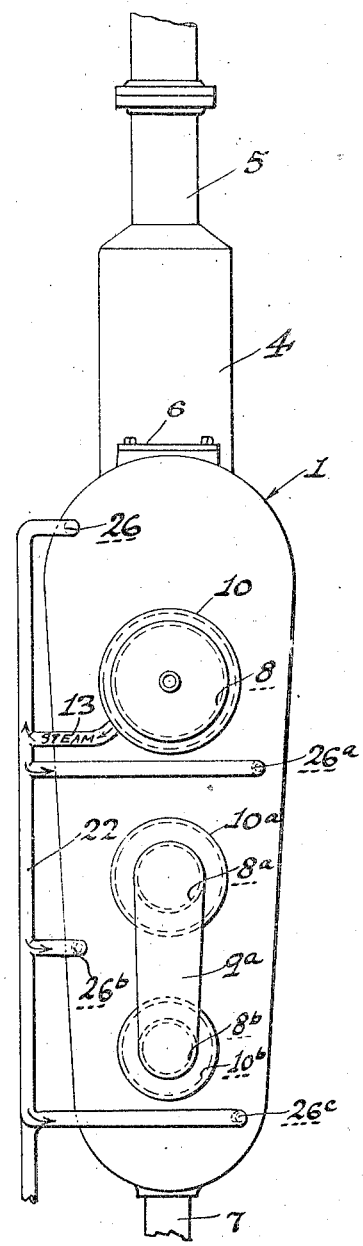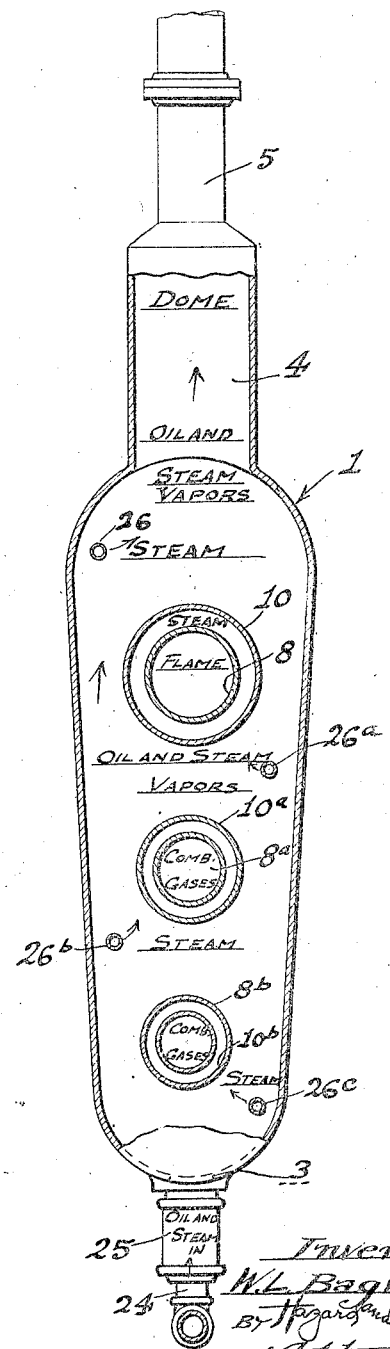

1,560,891

UNITED STATES PATENT OFFICE.

WILLIAM L. BAGWILL, OF LONG BEACH, CALIFORNIA.

CRACKING STILL FOR MINERAL OILS.

Application filed December 27, 1923. Serial No. 682,365.

*To all whom it may concern:*

Be it known that I, WILLIAM L. BAGWILL, a citizen of the United States, residing at Long Beach, in the county of Los Angeles and State of California, have invented new and useful Improvements in Cracking Stills for Mineral Oils, of which the following is a specification.

My present invention being referred to as a cracking still for mineral oils, it may be understood to be an object of this invention to provide improved means for the production of "gasoline" or the like from heavier mineral oils, such as the products currently sold, mainly for fuel purposes, under the name "distillate."

But it is also an object of this invention to provide an improved method or process for the cracking of mineral oils.

It is a further object of this invention to provide a novel and effective still of a type which may be compared with a pipe still, although in the present instance it is flame and the products of combustion that are carried backward and forward through pipes within a body of oil.

It is a further object of this invention to provide a novel cracking organization comprising a still whose height substantially exceeds its width, and which may be provided with substantially flat sides converging downwardly, the mentioned still being optionally surmounted at its top by a dome.

It is a further object of this invention to provide a novel still which may be, generally speaking, rectangular in its side elevational outline although comparatively thin and flat, and optionally presenting, in an end view, an outline which may be characterized as an elongated ovoid, with its broadest portion near its top.

It is a further object of this invention to provide an oil cracking organization comprising a still provided with substantially horizontal passages for the projection of flame therein and for the downward return of combustion products therethrough, the mentioned flame passages and gas passages being preferably surrounded by annular passages suitable for use in the preheating of steam; and in a preferred embodiment of my invention, the steam preheated as described may be introduced not only through an inlet provided for the introduction of oil and oil vapors at the bottom of my novel still, but also through perforated pipes, or the like, projecting laterally and horizontally therein.

It is a further object of this invention to provide means whereby the heat of a flame and of combustion gases may be utilized not only in the heating of steam and in the production of cracking temperatures within a still of the general character described but also in the preheating of oil fed thereto; and, in a preferred embodiment of my invention, the said gases may be used additionally and finally to produce or to heat steam, in advance of its introduction into my novel still; and the mixture of oil and water vapors finally escaping through the dome of my still may optionally be passed through a first preheater for the oil that is to be cracked; and a suitable fraction of the steam from a source referred to, or steam from another source, may be employed in conjunction with any or all of the features referred to for the improvement of the draft required for the suitable heating of my novel still and the mentioned parts optionally associated therewith.

Other objects of my invention will appear from the following description of a preferred embodiment therewith taken in connection with the appended claims and the accompanying drawings in which, Fig. 1 is a somewhat diagrammatic, longitudinal sectional view, showing one form of apparatus within the scope of my present invention and suitable for the execution of my novel process.

Fig. 2 is an elevational view from the direction of the arrow 2 in Fig. 1.

Fig. 3 is a vertical section, substantially on the line of 3—3 of Fig. 1.

Referring to the details of that specific embodiment of my invention chosen for purposes of illustration, 1 may be a still body, this still being supported in any suitable way, as by legs 2 conventionally shown, and provided with an inlet opening 3 in the bottom thereof and which a vapor dome 4 and vapor outlet pipe 5 extending from the top thereof, a manhole 6 and carbon outlets 7 being provided at any suitable points, such as the top and bottom respectively of my still.

In addition to the openings referred to, my still is preferably provided with heating means in the form of substantially horizontal passages 8, 8$^a$ and 8$^b$ for the projection of flame and the conduction of combustion gases therethrough, these passages being shown as connected by return bends 9, 9ª at opposite ends of my still and as provided with jackets 10, 10ª, 10ᵇ respectively connected by substantially vertical passages 11, 11ª located externally of my still and in proximity to the mentioned return bends, a steam inlet being provided at 12 and a steam outlet being provided at 13 in such a relationship that steam introduced through the valve 14 in the mentioned inlet 12 shall undergo a countercurrent heating while rising in contact with the pipes or passages 8ᵇ, 8ª and 8, through which flame and combustion products must descend,—these products being optionally conducted through a prolongation 8ᶜ, shown as surrounded by an oil preheater 15 and as connected with a stack 16, through which combustion gases may finally escape.

Although my described arrangement of pipes and flame passages and flues might be utilized in a still of any preferred type, I find it highly advantageous not only to employ pipes differing and related in size in the general manner best illustrated in Fig. 3 (from an inspection of which it will be seen that the flame passage 8 is larger than the passage 8ª and that this is in turn larger than the lower passage 8ᵇ) but also to employ therewith a still body non-circular in cross-section, my preferred still body being of comparatively great height in proportion to its width and of a length preferably exceeding its height, the upward divergent sides of my still being preferably flat although connected or emerging at top and bottom into oppositely curved substantially semicylindrical elements, in such manner as to produce, in an end view of my still, an upwardly elongated ovate outline,—the construction here referred to being preferably such that the horizontal distance between the outer walls of the respective steam jackets 10, 10ª, 10ᵇ, surrounding the pipes or flues 8, 8ª, 8ᵇ, and the inner surfaces of the upwardly tapering lateral walls of my novel still may be substantially uniform, as best shown in Figs. 2 and 3; and I consider it advantageous not only to preheat the oil fed to my novel still sufficiently to volatilize the major portion thereof, as by means of a first preheater 17 through which vapors from my still may be led and by means of the preheater 15, which I may regard as my second preheater, these preheaters being shown as connected by intermediate pipe 18 and by a feed pipe 19 extending to the inlet 3 of my still, but to use also steam directly introduced into said oil at the time of its admission through the inlet 3 and during its rise within the body of my still.

For the purpose last referred to I may provide superheated steam in any suitable manner, but my preferred means therefor may comprise, in addition to the described steam jackets 10, 10ª, 10ᵇ, surrounding the flame passages and flues 8, 8ª, 8ᵇ, a coil or coils 20, within the stack 16 and exposed therein to the heat of flue gases, this coil being shown as connected by a pipe 21 with the valved inlet 12 by which steam may be admitted in regulated amounts, into the mentioned jackets; and high pressure steam obtained through the outlet 13 may be led from a manifold 22 not only through the branch 23 and the nipple 24 (connected by a T 25 with the inlet 3 at the bottom of my still) but also from substantially horizontal perforated pipes 26, 26ª, 26ᵇ and 26ᶜ extending within the body of my still and shown as arranged in a staggered but parallel relationship to the various pipes and flues already described as extending therethrough. An extension 27 from the pipe 23, or from any other convenient source of high pressure steam may advantageously be carried to the draft jet 28 shown as provided with a hand valve 29 and as extending into the bottom of the stack 16, in known manner favorable to the production of a draft therethrough and through the flame and flue passages 8, 8ª, and 8ᵇ.

The inventions upon which protection is herein sought are the result not only of theoretical considerations directed to the economical and effective utilization of heat in the cracking of mineral oils but also reflect the results of experimental or empirical tests executed on a cut-and-try basis; and both the theoretical considerations and the tests referred to indicate that the relationships of shape and position which are adequately although somewhat diagrammatically shown in the drawing are of substantial importance in the economical and efficient execution of my novel process, in connection with which I may point out that, by the construction and mode of operation to which reference has been made, I may utilize a single set of flame tubes and flues, together with the vapor lines extending from the dome of my still, not only to preheat oil in two stages and to a temperature sufficient to completely or almost completely volatilize the same, thereafter exposing the vaporous products only to the heat of steam jackets, and jets (and not to any surfaces directly heated by flame) but also to heat steam in two stages, a preheating being effected within a stack and a final heating being effected within the mentioned jackets surrounding flame tubes and flues; and I effectively utilize the high temperature, high pressure steam so produced not only in the introduction of oil and hydrocarbon vapors into the bottom of my still but also in a highly advantageous heat treatment of the same therein.

Although the mode of operation of my still must obviously vary in accordance with the character of the oil treated and in accordance with the character of the intended products to be obtained therefrom. I may mention that, in the treatment of so-called "distillate" for the production of a gasoline such as is required by present markets, I may bring the introduced oil by means of the first and second preheaters described, or by equivalent means, to a temperature of approximately 500° F. driving the same into the bottom of my still with steam superheated to approximately 700° F. and the combined effect of the heat radiated from the tubes or flues, 8, 8ª and 8ᵇ and the steam introduced by the perforated pipes 26, 26ª, 26ᵇ, 26ᶜ, shown as extending substantially parallel therewith, may be the elevation of the resultant mixture of oil and oil vapors to a temperature of approximately 1000° F.; and the mixture of oil and oil vapors escaping through the vapor outlet 5, is found, under the conditions referred to, to contain very acceptable percentages of low boiling hydrocarbon marketable as gasoline; but it will be understood that the mixture so obtained must, under ordinary conditions, be re-run for the separation of the desired fraction or fractions therefrom; and that such quantities of mixed gases, including methane and the like, as may be produced incidentally to the described procedure may advantageously be used, with or without desired additions, in the heating of my still, as by means of a burner 30, shown as projected horizontally within the flame chamber or tube 8.

It will be noted that the height of the still is much greater than its width and preferably the length is greater than the height. The flame and combustion passages are made of such size that the oil surrounding each passage and extending to the outside walls is substantially the same thickness. The still is ovate in cross section, as clearly shown in Fig. 3, with the continuous flame and combustion passages decreasing in diameter from the top to the bottom. The passages for the combustion gases are proportioned so that as these gases cool and hence contract in the successively lower passages on account of the passages themselves being of smaller diameter, the velocity of the gases will be substantially the same. Also as the steam ascends in the casings outside of the combustion passages the steam will expand, but on account of the passages being of larger cross sectional area, the velocity will be substantially constant.

As will be appreciated by workers in this art, the prolonged operation of a still of the general character illustrated and described will inevitably result in the accumulation of carbon and carbonaceous residues therein; and for the cleaning of the same, such means as the manhole 6 and the carbon outlets 7 may be utilized, and it is well known that in organizations of this general type, in order to avoid risk of serious losses and delays, all parts may advantageously be welded together and provided with supporting means adequate even at such high temperatures as may seriously diminish the strength of the materials employed.

What I claim is:

1. A still for cracking oils having a greater diameter at the top than at the bottom, passages for a heating medium extending substantially horizontally through the shell in different elevations, said passages diminishing in cross sectional area from the top to the bottom in accordance with the cooling of the heating medium passed therethrough and means to introduce a heating medium in the uppermost passage and withdraw it from the lowermost passage, said passages and the exterior of the shell being positioned whereby the cross sectional area which may be occupied by the oil is substantially constant from the lowermost to the uppermost passage.

2. A still for cracking oil having a shell with upwardly diverging sides, with a base of less diameter than the top of the still, continuous passages through the still in substantially a horizontal direction, said passages diminishing in cross sectional area from the top to the bottom and being positioned whereby the cross-sectional area in the still which may be occupied by oil is substantially constant in a horizontal position at each successive passage, and means to introduce a heating medium in the uppermost passage and exhaust it from the lowermost passage.

3. A still for cracking oils having a shell of substantially ovate cross section with the apex at the bottom, said shell being of greater height than width, a series of passages for products of combustion extending continuously in a general horizontal direction through the still, said passages diminishing successively in cross sectional area from the uppermost to the lowermost passage and means to introduce combustion gases in the uppermost passage and exhaust it from the lowermost passages, said passages being positioned in relation to the shell whereby the cross sectional area which may be occupied by oil at different elevations surrounding the passages, is substantially constant.

4. A still for cracking oils as claimed in claim 3, having in addition a casing surrounding the passages for the combustion gases and means to introduce steam at the lowermost casing and exhaust it from the uppermost casing.

5. A still with lateral end walls comprising a series of vertically superimposed passages for flame and products of combustion surrounded by jackets for the heating of steam, the uppermost passage being the largest and the lowermost passage being the smallest and the lateral walls of said still being spaced at a substantially uniform distance from all of said jackets.

6. A still for cracking oil comprising a shell forming the still body of ovate cross section with the apex at the bottom, continuous combustion passages extending therethrough in a lengthwise direction and decreasing in diameter from the uppermost to the lowermost passage, and means for injecting a heating medium into the uppermost passage.

7. A still for cracking oil as claimed in claim 6 having the proportions of the combustion passages and the still body such that substantially a uniform thickness of oil surrounds each passage.

8. A still for cracking oil as claimed in claim 6 having steam jackets surrounding the combustion passages.

9. A still for cracking oil having in combination a shell forming a still body of substantially ovate cross section with flat sides and the apex at the bottom, and continuous combustion passages extending through the body lengthwise from end to end and the uppermost passage of the largest diameter, the other passages progressively diminishing in diameter, said passages being mounted in the still so that the oil between the passage and the lateral walls of the still is substantially the same thickness for each successive passage.

10. A still for cracking oil as claimed in claim 9 having means for injecting a heating medium in the uppermost passage.

11. A still for cracking oils as claimed in claim 9 having means for injecting a heating medium in the uppermost passage, and steam jackets surrounding the passages.

12. A still for cracking oil as claimed in claim 9 having means for injecting a heating medium into the uppermost passage, steam jackets surrounding the passages, and steam jets within the still body discharging into the body of the oil and vapor.

13. A still for cracking oil as claimed in claim 9 having means to inject a heating medium in the uppermost combustion passage, a dome on the top of the still body to carry off the oil vapors, an oil pre-heater in the path of the oil vapors, and a second oil pre-heater in the path of the products of combustion exterior to the still.

In testimony whereof I have signed my name to this specification.

W. L. BAGWILL.